(12) United States Patent
Shen et al.

(10) Patent No.: US 12,715,346 B2
(45) Date of Patent: Aug. 25, 2026

(54) STRIKER ASSEMBLY AND SEAT ASSEMBLY

(71) Applicant: Lear Corporation, Southfield, MI (US)

(72) Inventors: Yanyun Shen, Shanghai (CN); Jingyu Kang, Shanghai (CN); Cheng Ye, Shanghai (CN); Yue Zuo, Shanghai (CN); Guogang Chen, Shanghai (CN)

(73) Assignee: Lear Corporation, Southfield, MI (US)

( * ) Notice: Subject to any disclaimer, the term of this patent is extended or adjusted under 35 U.S.C. 154(b) by 118 days.

(21) Appl. No.: 18/775,493

(22) Filed: Jul. 17, 2024

(65) Prior Publication Data

US 2025/0074269 A1 Mar. 6, 2025

(30) Foreign Application Priority Data

Aug. 29, 2023 (CN) ........................ 202311103354.4

(51) Int. Cl.
*B60N 2/22* (2006.01)
*B60N 2/02* (2006.01)

(52) U.S. Cl.
CPC ....... *B60N 2/2245* (2013.01); *B60N 2/02253* (2023.08); *B60N 2/2231* (2013.01)

(58) Field of Classification Search
CPC ........................ B60N 2/2245; B60N 2/02253; B60N 2/2231; B60N 2/02258; B60N 2/02246
See application file for complete search history.

(56) References Cited

U.S. PATENT DOCUMENTS

| | | | | |
|---|---|---|---|---|
| 8,857,908 | B2 | 10/2014 | Brncick | |
| 10,293,712 | B2 | 5/2019 | Ruan | |
| 10,780,798 | B2 | 9/2020 | Falster | |
| 11,254,243 | B2 * | 2/2022 | Nock | B60N 2/366 |
| 11,654,801 | B2 | 5/2023 | Godard | |

FOREIGN PATENT DOCUMENTS

| | | | | |
|---|---|---|---|---|
| CA | 3028902 | A1 * | 8/2019 | B60N 2/22 |
| CN | 114407745 | A | 4/2022 | |
| DE | 19629964 | A1 * | 1/1998 | B60N 2/02246 |
| DE | 19949435 | A1 | 4/2001 | |
| DE | 102019217911 | B3 | 3/2021 | |
| DE | 102021124019 | A1 | 3/2023 | |
| EP | 1410945 | A1 | 4/2004 | |
| FR | 3058103 | A1 * | 5/2018 | B60N 2/2245 |
| JP | 2008201152 | A | 9/2008 | |

OTHER PUBLICATIONS

Office Action from corresponding German patent application DE102024110481.3 May 22, 2025.

* cited by examiner

*Primary Examiner* — Milton Nelson, Jr.
(74) *Attorney, Agent, or Firm* — McGarry Bair PC

(57) ABSTRACT

The present application relates to a striker assembly and a seat assembly. A striker assembly includes a motor, a worm screw operably coupled with the motor, a gear segment engaged with the worm screw, and a striker connected to the gear segment and configured for engagement with a latch of a seat back of the seat to adjustably couple the seat back with a mounting surface.

20 Claims, 18 Drawing Sheets

1060
1078
1084
1086
1148
1108
1150
1070
1130
1152
1082
1076
1110
1106
1072
1108
1130
1140b
1126
1112
1134
1100
1104
1140a
1140
1154
1142
1120
1136
1128
1102

STRIKER ASSEMBLY AND SEAT ASSEMBLY

TECHNICAL FIELD

The present disclosure generally relates to striker assemblies and seat systems, including striker assemblies and seat systems that can, for example, be utilized in connection with vehicles.

DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
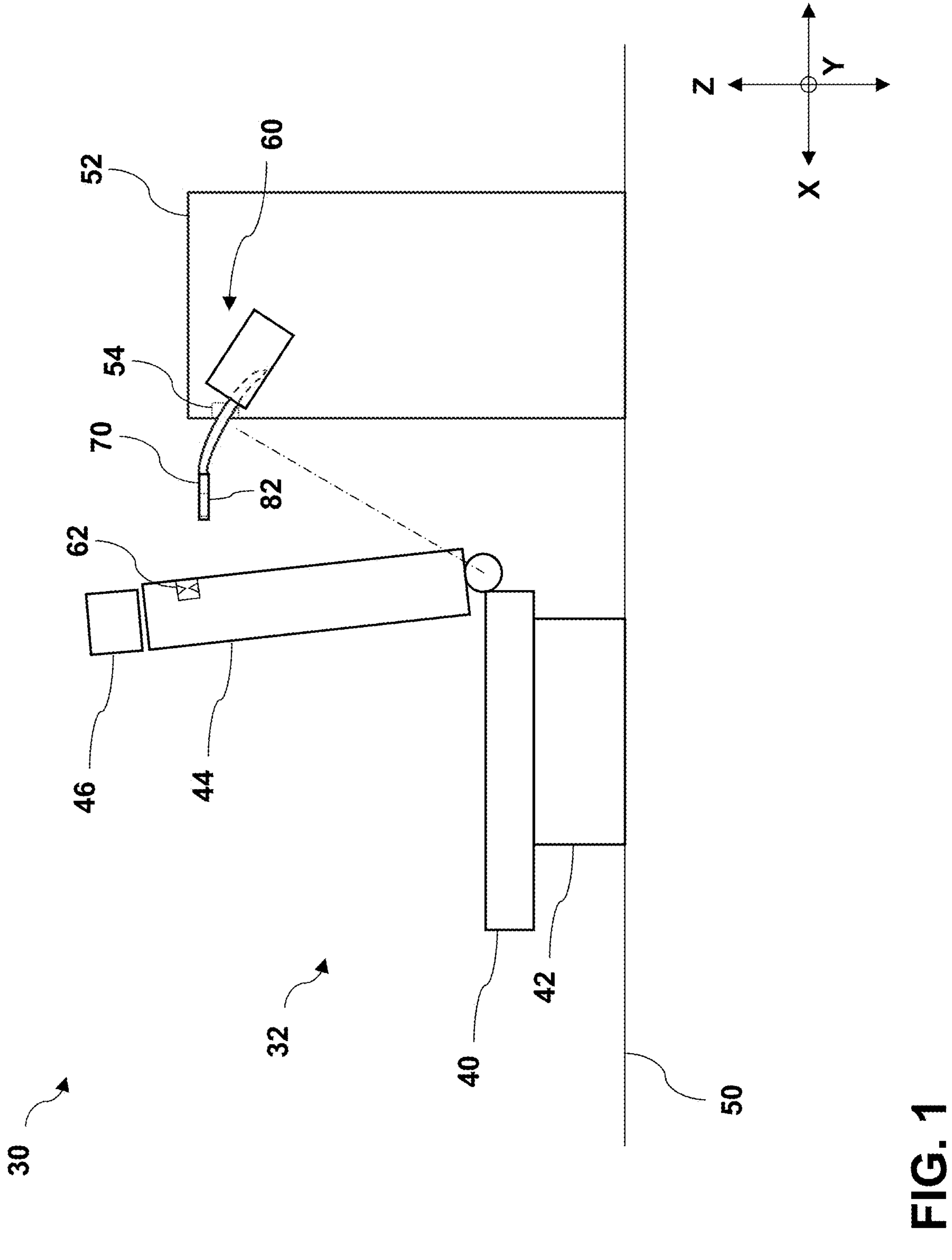
FIGS. 1-3 are schematic side views generally illustrating embodiments of a seat system according to teachings of the present disclosure.
Figure 2:
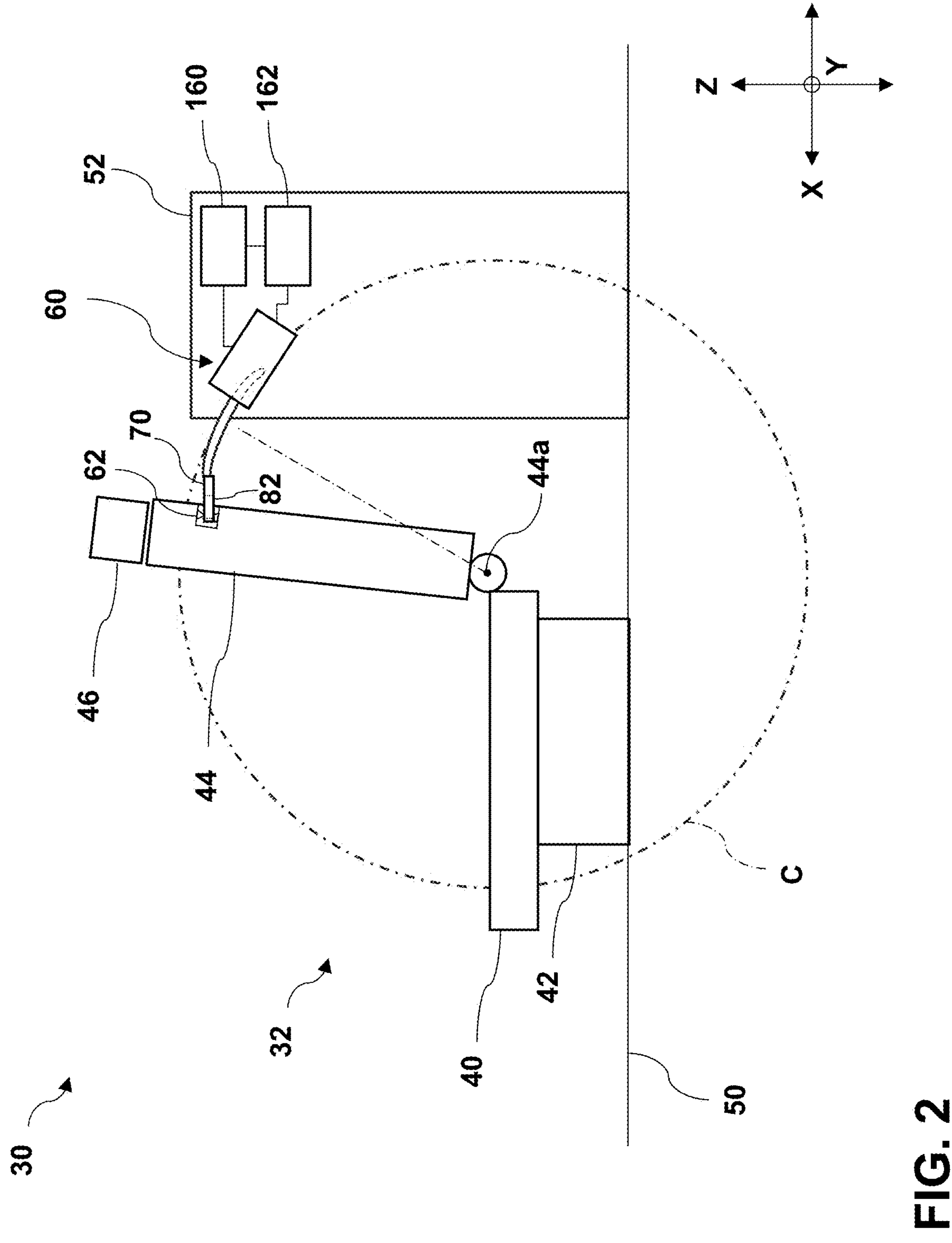
Figure 3:
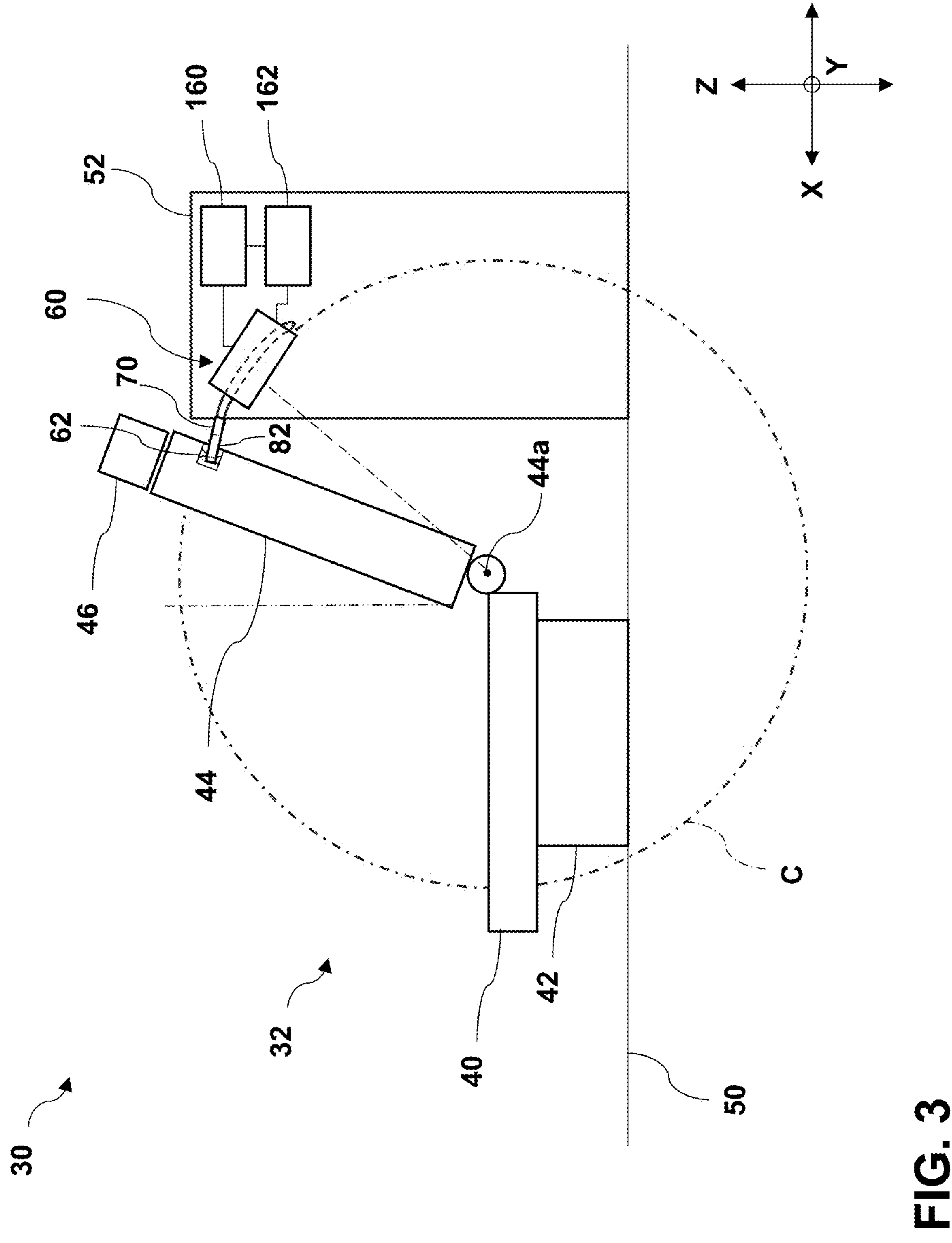

Referring to FIG. 1, a seat system 30 includes a seat assembly 32 including a seat base 40, a seat frame 42, a seat back 44, and/or a headrest 46. The seat back 44 is rotatably connected to the seat base 40 and/or the seat frame 42. The seat assembly 32 is mounted to a mounting surface 50 (e.g., a vehicle floor). The seat system 30 includes a striker assembly 60 mounted to a wall 52 (e.g., a vehicle body, wall, panel, among others). The striker assembly 60 selectively and adjustably connects the seat assembly 32 to the wall 52. For example, a latch 62 of the seat back 44 selectively engages the striker assembly 60. As generally illustrated in FIG. 1, the latch 62 includes a disengaged state in which the latch 62 is disengaged from a striker 70 of the striker assembly 60. Optionally, the striker assembly 60 is mounted to an outer side of the wall 52 and extends at least partially through a hole 54 in the wall 52 to engage the latch 62. As generally illustrated in FIGS. 2 and 3, the latch 62 includes an engaged state in which the latch 62 is engaged with the striker 70 of the striker assembly 60. When the latch 62 is engaged with the striker assembly 60, the striker assembly 60 can adjust the rotational position of the seat back 44 about a rotational axis 44*a* that can be aligned with a transverse direction Y. For example, the seat back 44 includes a first rotational position shown in FIG. 2 and a second rotational position shown in FIG. 3, and operation of the striker assembly 60 can rotate the seat back 44 between the first and second positions. A difference between the first rotational position and the second rotational position can, for example, be greater than two degrees, five degrees, 12 degrees, 15 degrees, or other values, and less than 90 degrees.

Figure 4:
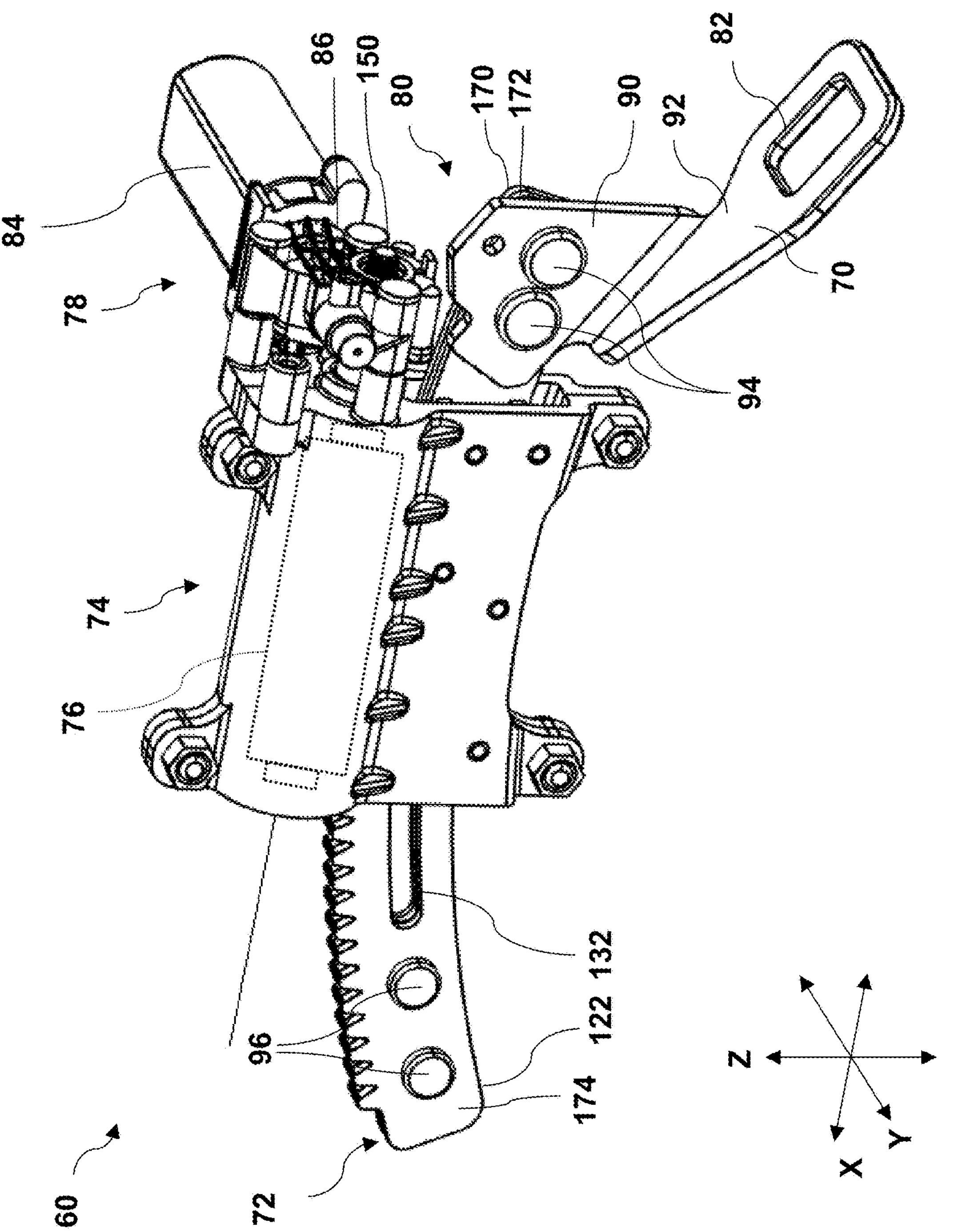
FIG. 4 is a perspective view generally illustrating an embodiment of a striker assembly according to teachings of the present disclosure.
Figure 5:
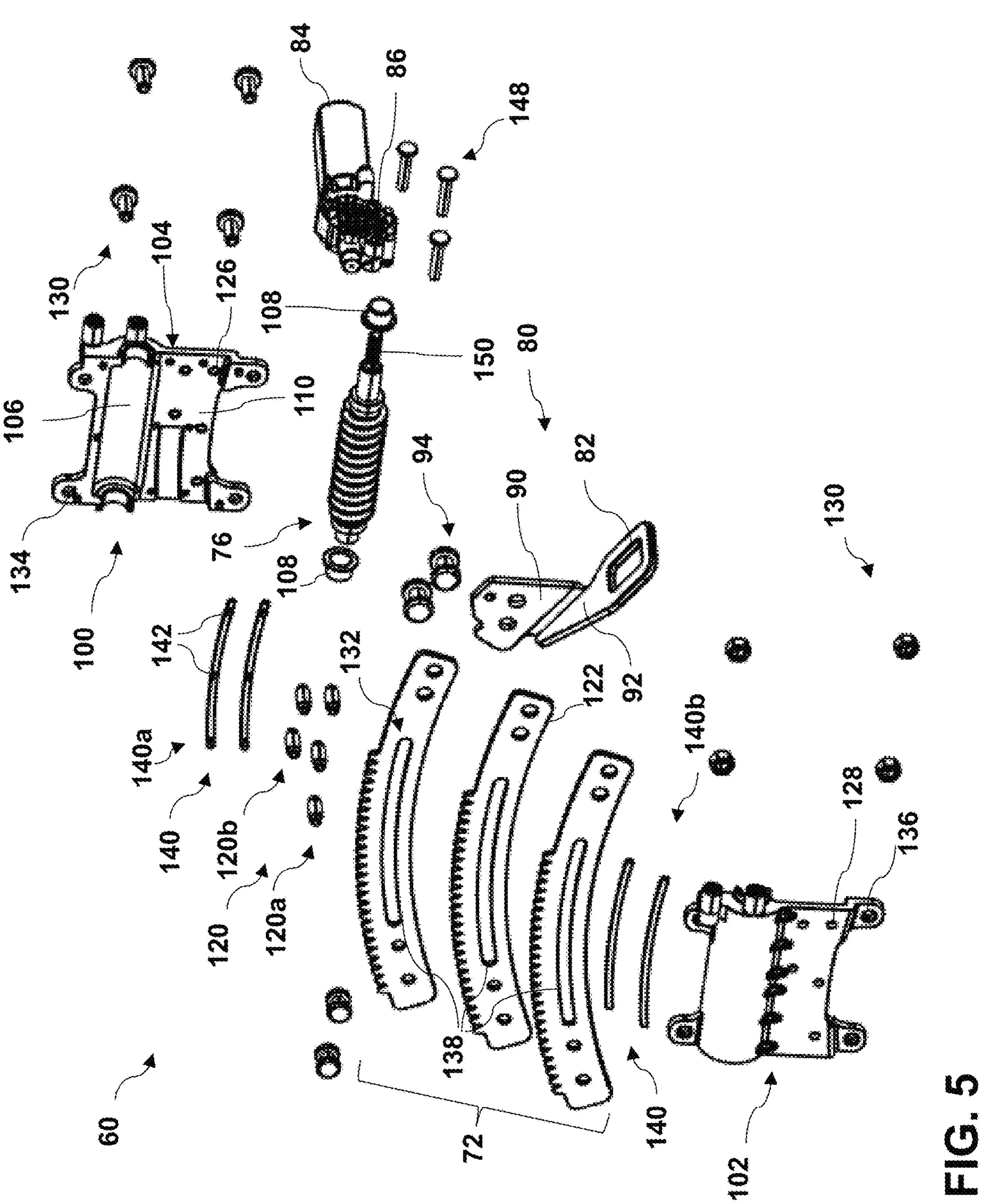
FIG. 5 is an exploded perspective view generally illustrating an embodiment of a striker assembly according to teachings of the present disclosure.

Referring to FIGS. 4 and 5, the striker assembly 60 includes a striker 70, a gear segment 72, a housing 74, a worm screw 76 (e.g., a "worm"), and a motor assembly 78. The gear segment 72 and the worm screw 76 are disposed at least partially in the housing 74. The motor assembly 78 is operably coupled with the worm screw 76. For example, the motor assembly 78 can include a motor 84 and a transmission 86. The transmission 86 can be operably coupled with the motor 84 and the worm screw 76 such that actuation (e.g., rotation) of the motor 84 causes rotation of the worm screw 76. The worm screw 76 is engaged with the gear segment 72 such that rotation of the worm screw 76, such as via the motor assembly 78, causes movement of the gear segment 72 relative to the housing 74. The movement of the gear segment 72 can include sliding movement. Optionally, the gear segment 72 defines a portion of a circle C centered at the rotational axis 44*a* (see, e.g., FIGS. 2 and 3), and/or sliding movement of the gear segment 72 includes the gear segment 72 moving along the circumference of the circle C. Movement of the gear segment 72 in a generally arcuate path, which can include moving about the circumference of the circle C, can allow for a greater range and/or greater efficiency of adjustment of the seat back 44, such as compared to linear movement.

The striker 70 is connected (e.g., fixed) to the gear segment 72 such that the striker 70 moves with gear segment 72. Optionally, the striker 70 is fixed at a forward end 80 of the gear segment 72. The striker 70 includes an aperture 82 that engages the latch 62. Optionally, the striker 70 includes a first portion 90 and a second portion 92. The first portion 90 is fixed to the gear segment 72, such as via one or more fasteners 94 (e.g., bolts, nuts, rivets, among others). The first portion 90 is parallel to the gear segment 72. For example, the first portion 90 can be parallel to an X-Z plane. The second portion 92 extends from the first portion 90, such as at an angle equal to or between 80 degrees and 100 degrees, and includes the aperture 82, which is open generally in the vertical direction Z in an assembled position.

Referring to FIG. 5, the housing 74 includes a first housing member 100 and a second housing member 102. The first and second housing members 100, 102 cooperate to at least partially define a housing interior 104. The worm screw 76 is disposed at least partially in a first portion 106 of the housing interior 104. Optionally, the first portion 106 is cylindrical, and/or a pair of bushings 108 are disposed at ends of the first portion 106 to rotatably support the worm screw 76. The gear segment 72 is disposed at least partially in a second portion 110 of the housing interior 104. One or more bearings 120 (e.g., roller bearings) are disposed in the second portion 110 to slidably support the gear segment 72. Optionally, the one or more bearings 120 include a plurality of bearings **120*a* connected to the housing to support the inner radial surface 122 of the gear segment 72 and one or more bearings 120*b* connected to the housing 74 and extending through a slot 132 of the gear segment 72. The bearings 120 cooperate to facilitate sliding movement of the gear segment 72 along an arcuate or rounded path (e.g., about the circumference of the circle C—see FIGS. 2 and 3). The bearings 120 are inserted into recesses/apertures 126 of the first housing member 100 and corresponding recesses/apertures 128 of the second housing member 102. A plurality of fasteners 130 connect the first housing member 100 with the second housing member 102 via apertures 134, 136 of the housing members 100, 102**.

The striker assembly 60 optionally includes one or more bearing strips 140 disposed at least partially in and/or integrally formed with the housing 74. One or more first bearing strips **140*a* can be disposed between the gear segment 72 and the first housing member 100. One or more second bearing strips 140*b* can be disposed between the gear segment 72 and the second housing member 102. The bearing strips 140 limit movement of the gear segment 72 toward the housing members 100, 102, which reduces play in the transverse direction Y. The bearing strips 140 can include protrusions 142 that extend (e.g., in the transverse direction Y) into recesses/apertures 144, 146 of the housing members 100, 102. The bearing strips 140 can include one or more of a variety of shapes, sizes, configurations, and/or materials. For example and without limitation, a bearing strip 140** can be elongated, rounded, triangular, rectangular, or oval-shaped, among other configurations.

The motor assembly 78 can be connected to the housing 74 via one or more fasteners 148. For example, in the illustrated example, the fasteners 148 fix the motor assembly 78 to the first housing member 100 and the second housing member 102.

Figure 6:
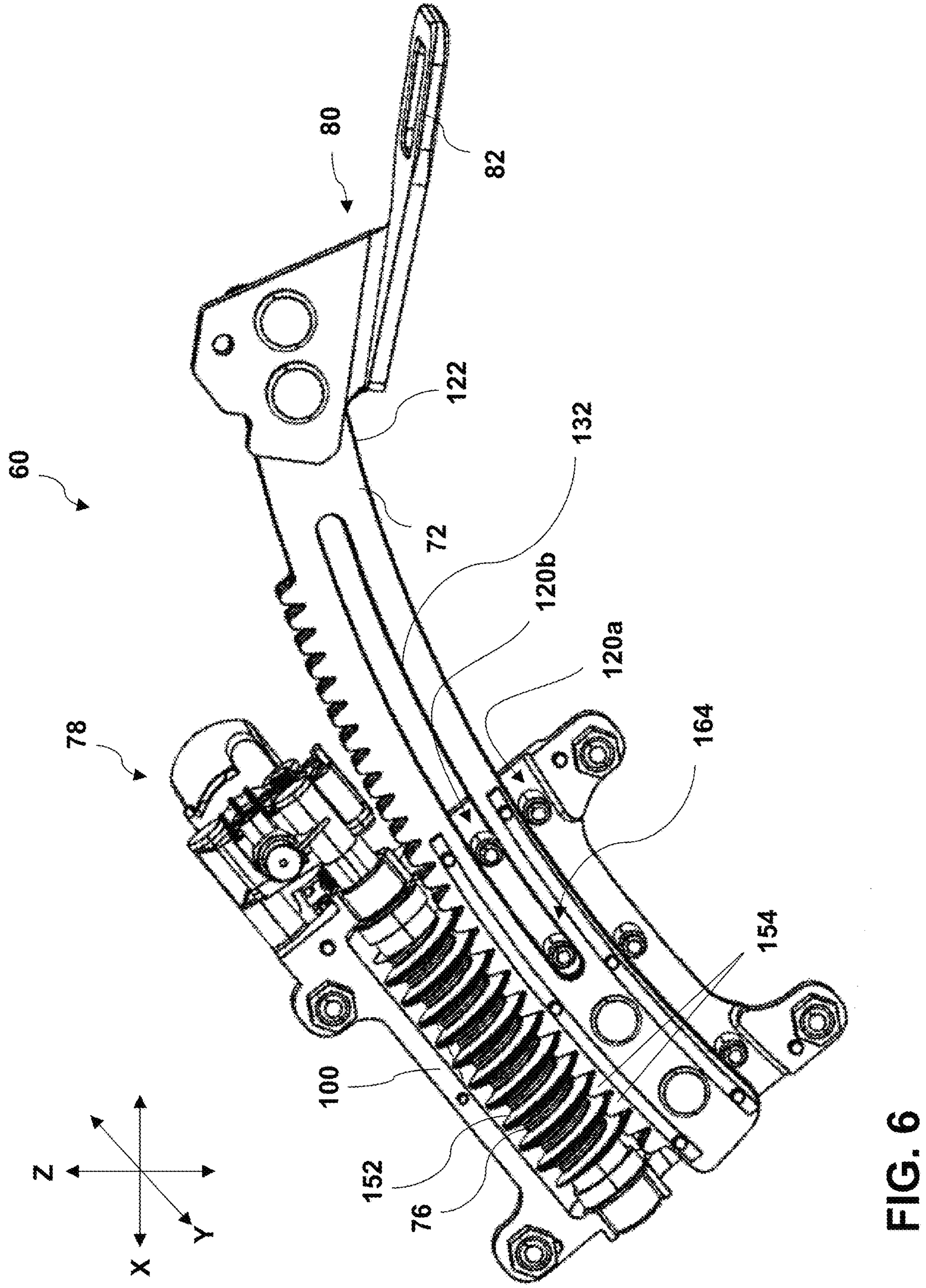
FIG. 6 is a perspective view generally illustrating an embodiment of a striker assembly in a first position, with a housing member hidden, according to teachings of the present disclosure.
Figure 7:
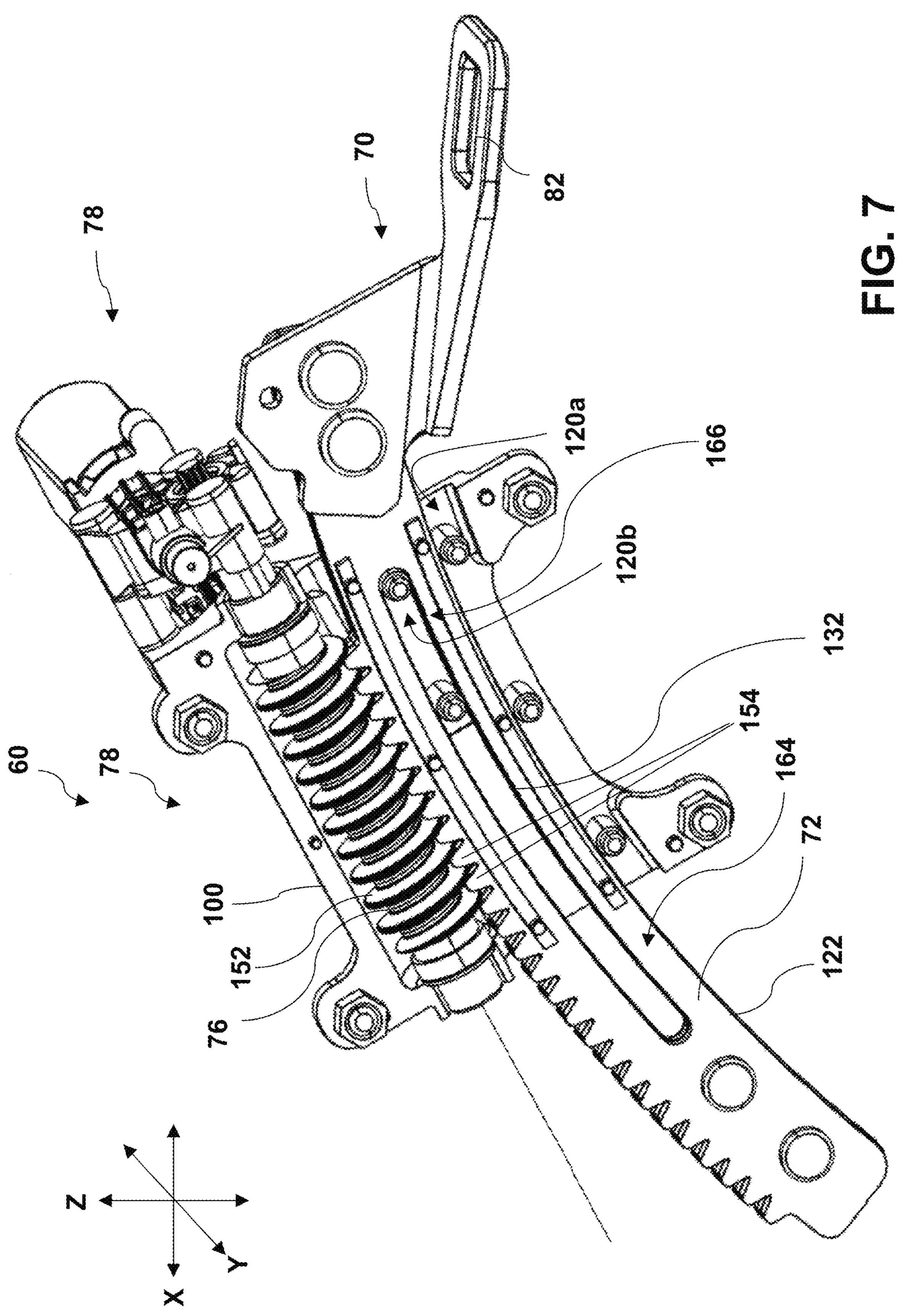
FIG. 7 is a perspective view generally illustrating an embodiment of a striker assembly in a second position, with a housing member hidden, according to teachings of the present disclosure.

Referring to FIGS. 6 and 7, the worm screw 76 operably couples the motor assembly 78 with the gear segment 72. The worm screw 76 optionally includes a splined portion 150 that is engaged with the transmission 86. The worm screw 76 includes a thread 152 that is engaged with a plurality of gear segment teeth 154 extending from the outer radial surface of the gear segment 72. Optionally, the worm screw 76 is engaged with at least four, five, six, seven, or more of the gear segment teeth 154. Compared to other designs with meshing gears, such a configuration can provide increased locking force to maintain the position of the seat back 44 (e.g., before one or both of the gear segment 72 and the worm screw 76 damaged sufficiently to disengage), such as during a vehicle crash. Additionally or alternatively, the engagement between the thread 152 and the gear segment teeth 154 is configured such that the gear segment 72 cannot back drive the worm screw 76 (e.g., the gear segment teeth 154 may lock or bind on the thread 152 when the worm screw 76 is not the driving the gear segment 72).

The gear segment 72 includes a plurality of positions, including a first/extended position shown in FIG. 6 and a second/retracted position shown in FIG. 7. When the seat back 44 is engaged with the striker assembly 60, the extended position disposes the seat back 44 in the first position shown in FIG. 2, and the retracted position disposes the seat back 44 in the second position shown in FIG. 3. The seat back 44 and/or the latch 62 can engage the striker assembly 60 at any position of the gear segment 72. The striker assembly 60 can be actuated to move the seat back 44 to and between the first and second positions. For example, the striker assembly 60 can include and/or be connected to an electronic controller 160 and/or a user interface 162, one or both of which can control actuation of the motor 84. In the first/extended position of the gear segment 72 shown in FIG. 6, the bearing(s) **120*b* are disposed at a rear end 164 of the slot 132. In the second/retracted position of the gear segment 72 shown in FIG. 7, the bearing(s) 120*b* are disposed at a front end 166 of the slot 132. Optionally, the bearing(s) 120*b* can act as an end stop limiting the forward sliding movement and/or rearward sliding movement of the gear segment 72**.

Figure 8:
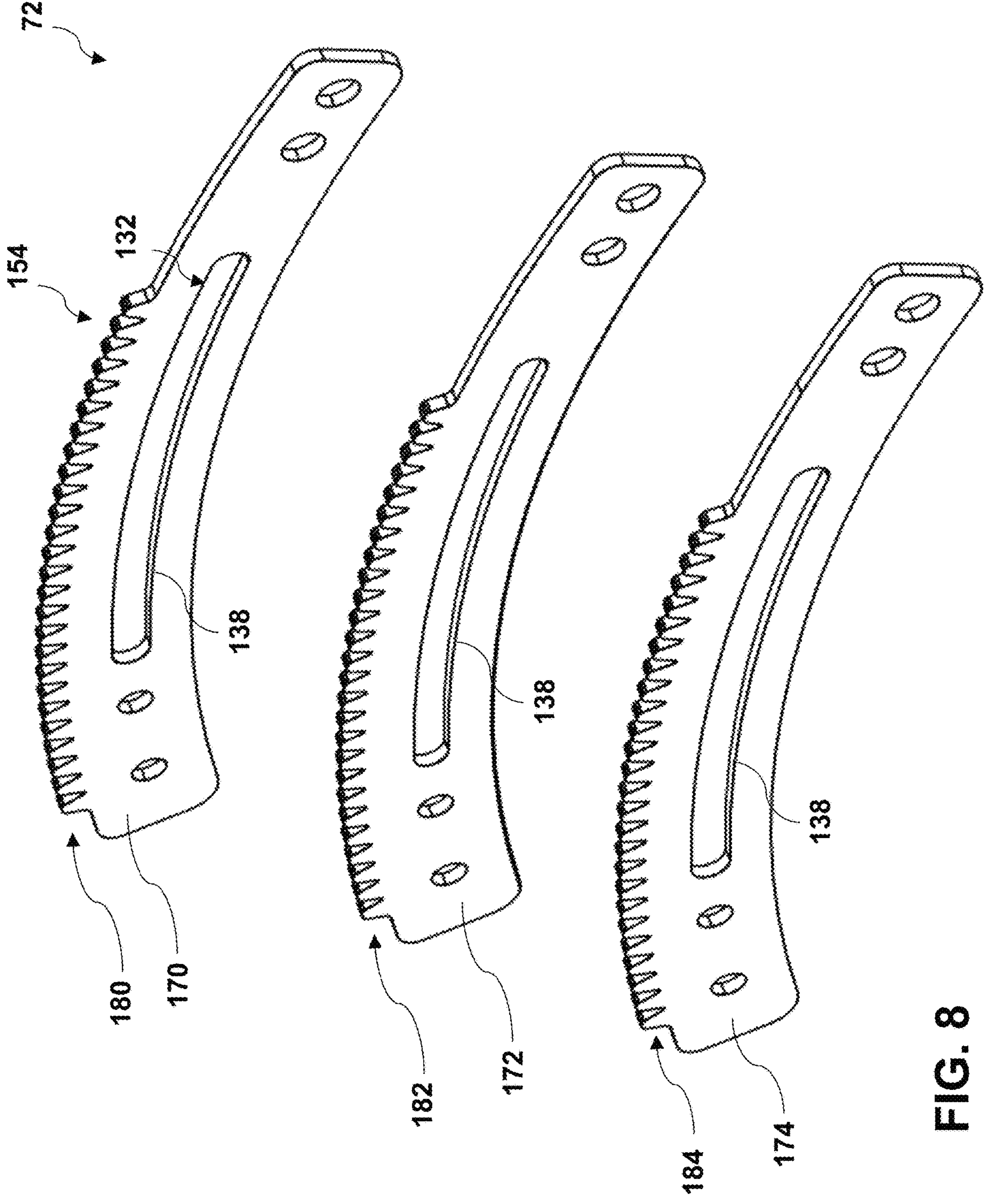
FIG. 8 is an exploded perspective view generally illustrating an embodiment of a gear segment according to teachings of the present disclosure.

Referring to FIG. 8, the gear segment 72 includes one or more layers, such as a first layer 170, a second layer 172, and/or a third layer 174. The layers 170-174 are adjacent to each other such that the second layer 172 is disposed between the first layer 170 and the third layer 174. The layers 170-174 each include layer teeth 180, 182, 184, respectively, that are at least partially aligned to define the gear segment teeth 154. The layers 170-174 can be fixed together by the set of fasteners 94 and/or an additional set of fasteners 96 (see, e.g., FIG. 4). The layers 170-174 can include one or more materials. At least one layer 170-174 can be a structural layer configured to transfer force from the worm screw 76 to the gear segment 72. Additionally or alternatively, at least one additional layer 170-174 can be configured to reduce play between the gear segment 72 and the worm screw 76. Optionally, the first and third layers 170, 174 are structural layers and comprise metal, and the second layer 172 reduces play between the gear segment 72 and the worm screw 76 and comprises plastic. Each of the layers 170-174 can include a layer slot 138 that aligns with the layer slot of the adjacent layer(s) 170-174 to define the slot 132.

Figure 9:
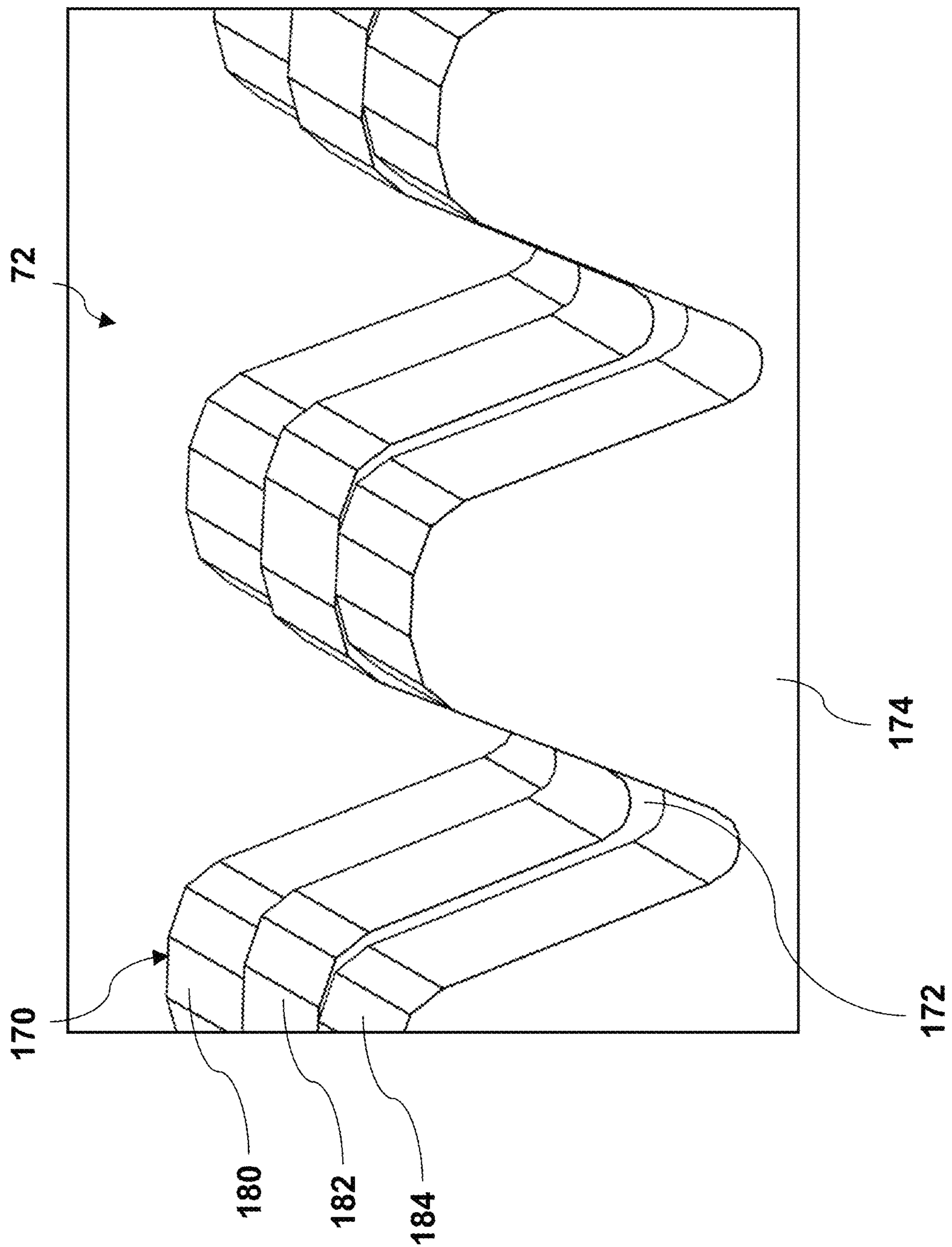
FIG. 9 is an enlarged perspective view generally illustrating a portion of an embodiment of a gear segment according to teachings of the present disclosure.

Referring to FIG. 9, the layer teeth 182 of the second layer 172 have a different shape, at least to some degree, than the layer teeth 180, 184 of the first and third layers 170, 174, such as to reduce play between the gear segment 72 and the worm screw 76. For example, the layer teeth 182 can include a greater circumferential extent, a greater radial extent, different angles, or a combination thereof. In some configurations, the maximum radial extent of the layer teeth 180-184 is equal. During normal operation, the second layer 172 and the layer teeth 182 may receive most or all of the force transferred from the worm screw 76. If a high force event occurs (e.g., a vehicle crash), the second layer 172 and the layer teeth 182 may deform to some degree and/or one or both of the first layer 170 and the third layer 174, including teeth 180, 184, may contact the worm screw 76, or contact the worm screw 76 to a greater extent, to restrict movement of the gear segment 72 and the seat back 44. In some configurations, the gear segment 72 can include other numbers of layers and/or other materials. For example, if reducing play between the gear segment 72 and the worm screw 76 is not desired, the gear segment 72 may not include a layer comprising plastic. Additionally or alternatively, if the strength of a layer comprising plastic (e.g., the second layer 172) is sufficient, one or both of the other layers 170, 174 may be omitted or replaced with layers comprising plastic. Additional layers can be added to provide additional strength. In some configurations, the first and third layers 170, 174 can comprise plastic, the second layer 172 can comprise metal, and the layer teeth 180, 184 can have a different shape and/or be larger than the layer teeth 182.

Figure 10:
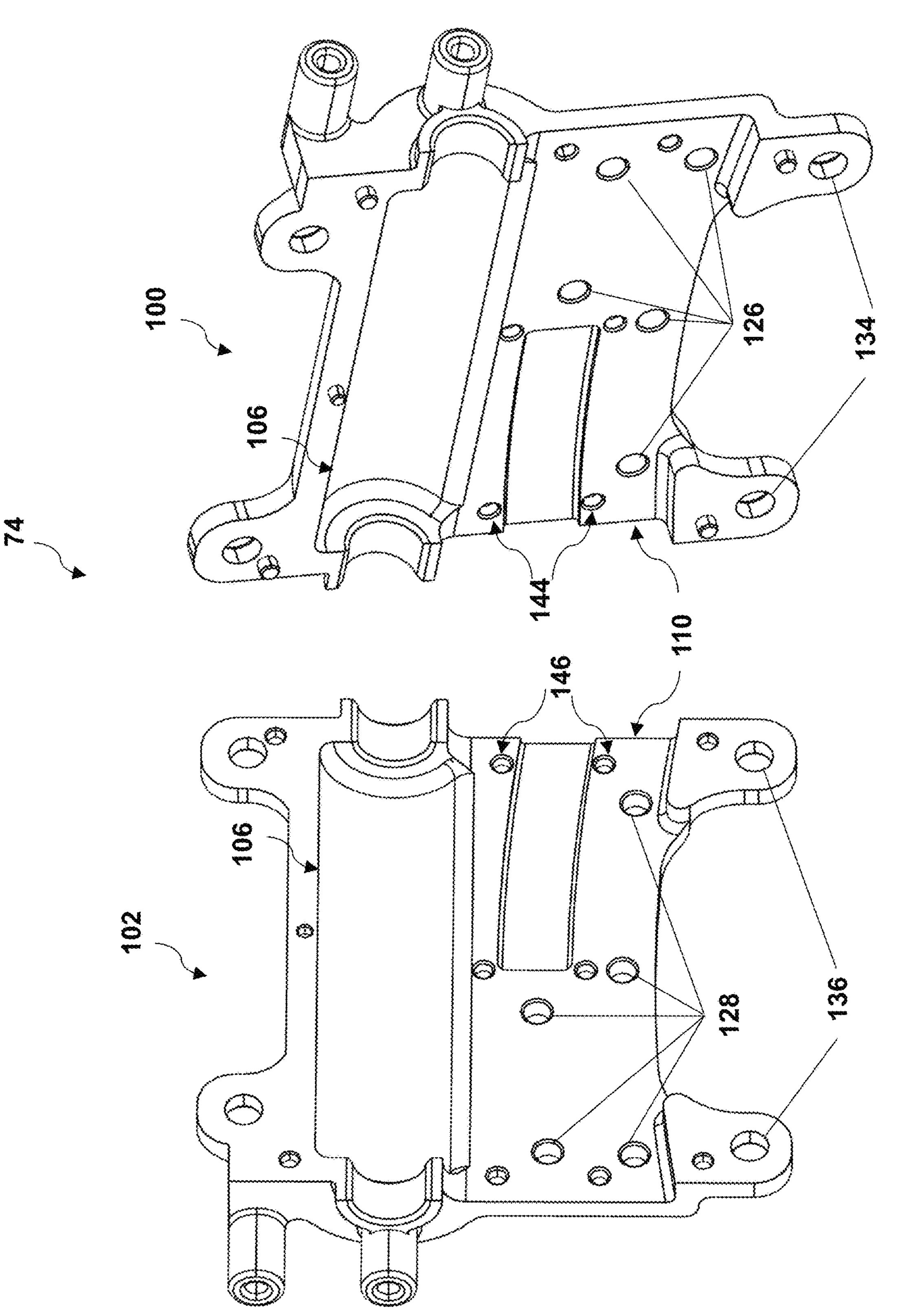
FIG. 10 is an exploded perspective view generally illustrating an embodiment of first and second housing members of a housing according to teachings of the present disclosure.

Referring to FIG. 10, the first housing member 100 and the second housing member 102 are illustrated. The first and second housing members 100, 102 include the housing interior first portion 106 for the worm screw 76, the housing interior second portion 110 for the gear segment 72, the recesses/apertures 126, 128 for the bearings 120, the apertures 134, 136 for the fasteners 130, and the recesses/apertures 144, 146 for the bearing strips 140.

Figure 11:
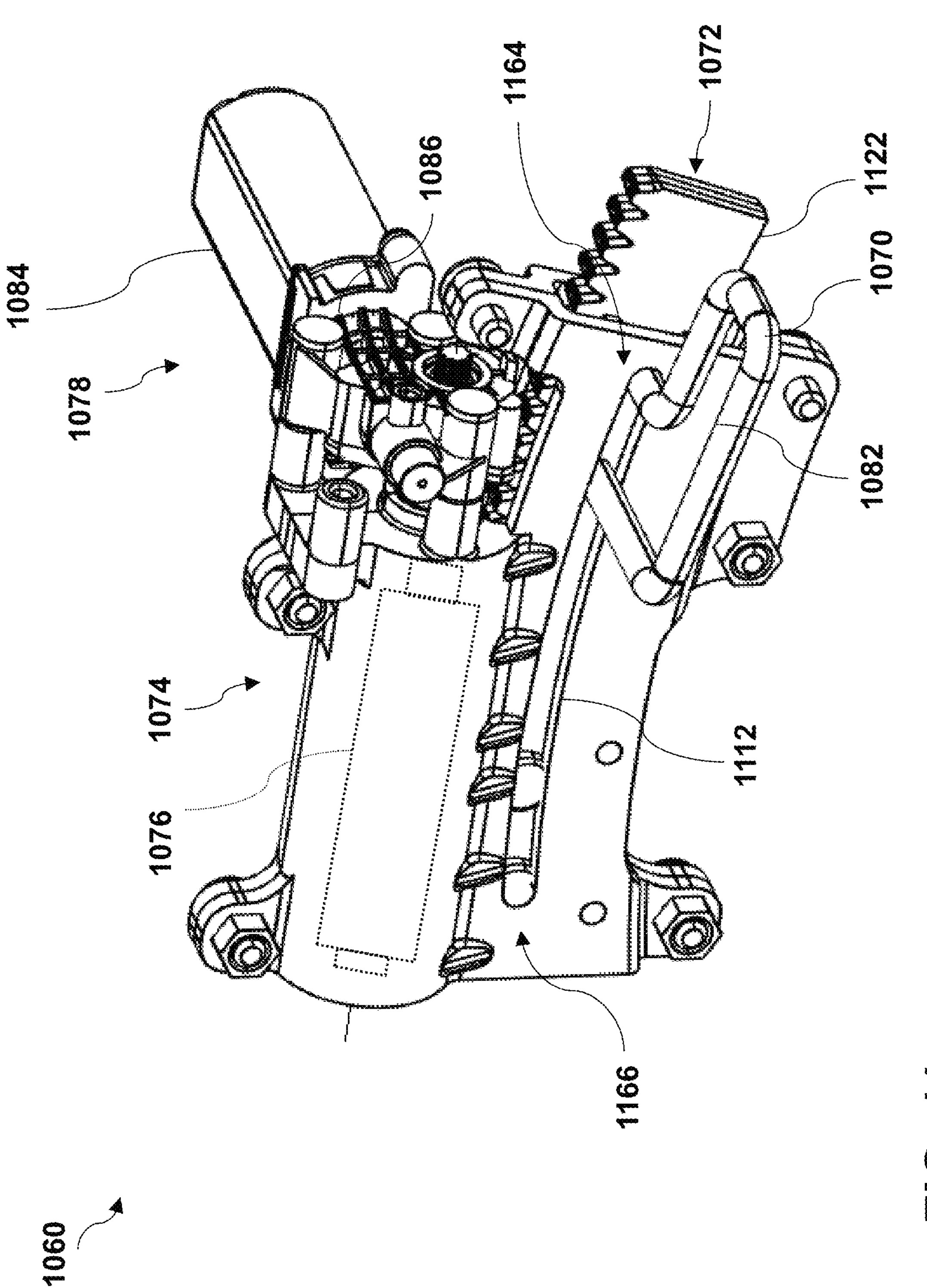
FIG. 11 is a perspective view generally illustrating an embodiment of a striker assembly according to teachings of the present disclosure.
Figure 12:
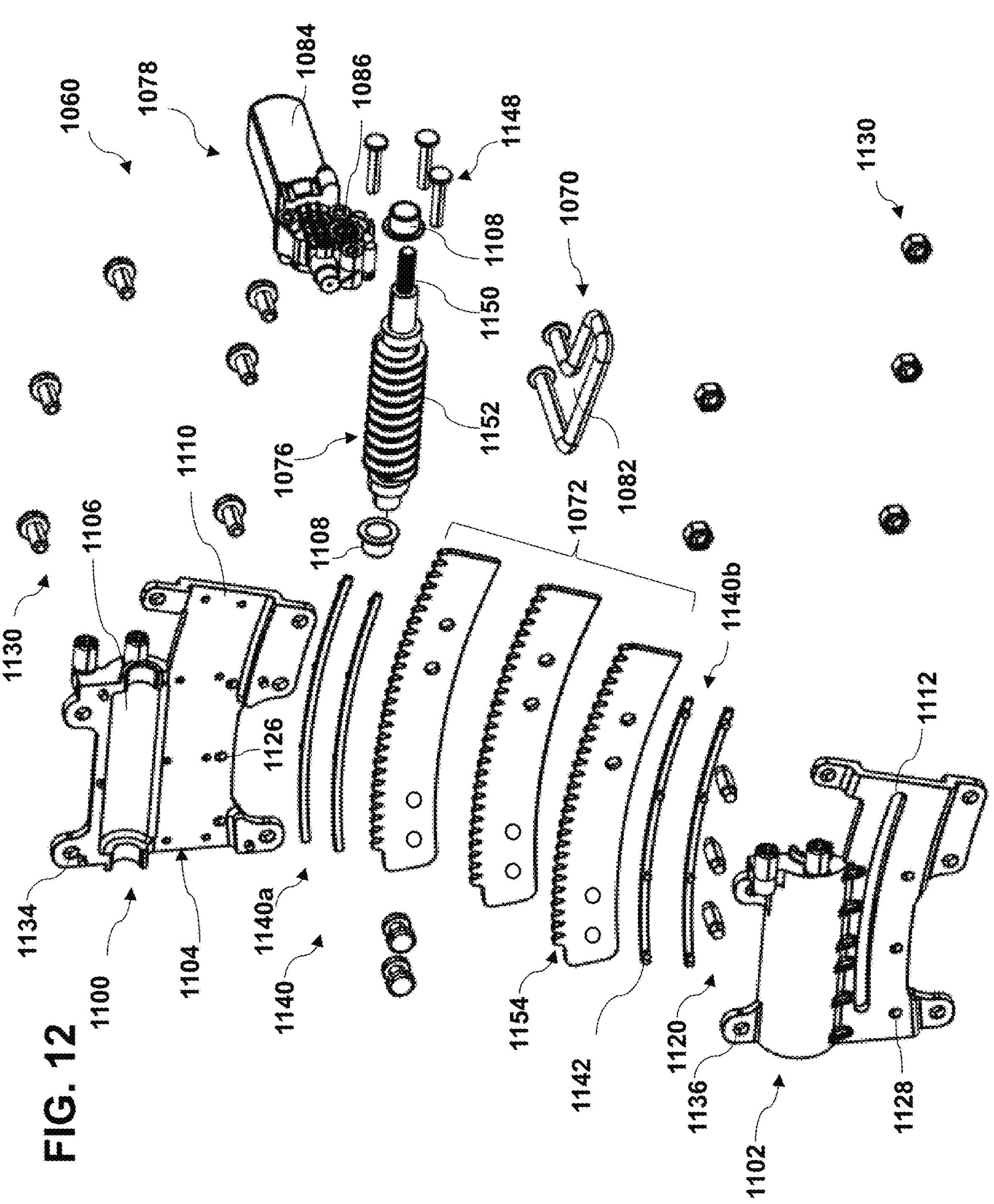
FIG. 12 is an exploded perspective view generally illustrating an embodiment of a striker assembly according to teachings of the present disclosure.

Referring to FIG. 11, the seat system 30 illustrated in FIGS. 1-3 can include a striker assembly 1060, such as instead of the striker assembly 60. The striker assembly 1060 includes one or more components that are similar to the components described in connection with the striker assembly 60. For example, as generally illustrated in FIG. 12, the striker assembly 1060 includes a striker 1070, a gear segment 1072, a housing 1074 having first and second housing members 1100, 1102, a worm screw 1076, and a motor assembly 1078 having a motor 1084 and a transmission 1086. The first and second housing members 1100, 1102 define a housing interior 1104 having a first portion 1106 and a second portion 1110. A pair of bushings 1108 are disposed in the first portion 1106 to rotatably support the worm screw 1076. A set of bearings 1120 are connected to the housing 1074 and support the inner radial surface 1122 of the gear segment 1072. The set of bearings 1120 extend into recesses/apertures 1126, 1128 of the housing members 1100, 1102. A set of fasteners 1130 connect the housing members 1100, 1102 together via respective apertures 1134, 1136. A set of bearing strips 1140 including bearing strips 1140*a*, 1140*b* have protrusions 1142 extending into recesses/apertures 1144, 1146 of the housing members 1100, 1102 and limit transverse play of the gear segment 1072. The worm screw 1076 includes a splined portion 1150 that engages the transmission 1086, and the worm screw 1076 includes a thread 1152 that engages gear segment teeth 1154 of the gear segment 1072. A set of fasteners 1148 connect the motor assembly 1078 to the housing 1074.

The striker 1070 is connected to a side of the gear segment 1072 and extends through a slot 1112 of the second housing member 1102. The striker 1070 includes an L-shaped loop that defines an aperture 1082, includes ends fixed to the gear segment 1072, and includes a circular cross-section, but can include other configurations. Optionally, the striker 1070 defines a plane that is perpendicular to the seat back 44 in an assembled configuration. The slot 1112 in the second housing member 1102 is arcuate, and the angular extent of the slot 1112 corresponds to the angular adjustment/rotation of the seat back 44 provided via the striker assembly 1060.

Figure 13:
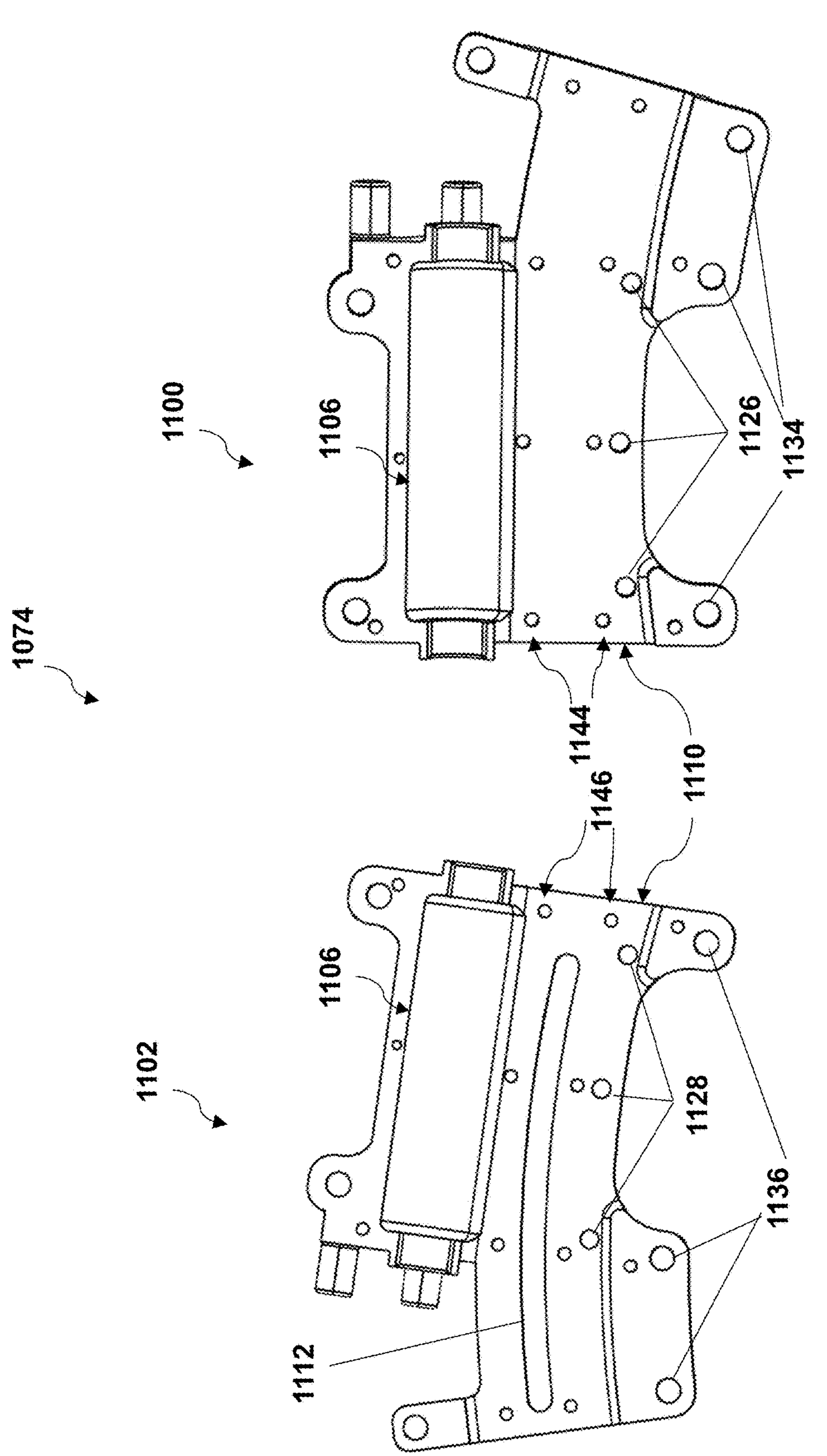
FIG. 13 is an exploded perspective view generally illustrating an embodiment of first and second housing members of a housing according to teachings of the present disclosure.

Referring to FIG. 13, the first housing member 1100 and the second housing member 1102 of the housing 1074 are illustrated. The first and second housing members 1100, 1102 cooperate to define the housing interior first portion 1106 for the worm screw 1076, and the housing interior second portion 1110 for the gear segment 1072. The first and second housing members 1100, 1102 include the recesses/apertures 1126, 1128 for the bearings 1120, the apertures 1134, 1136 for the fasteners 1130, and the recesses/apertures 1144, 1146 for the bearing strips 1140.

Figure 14:
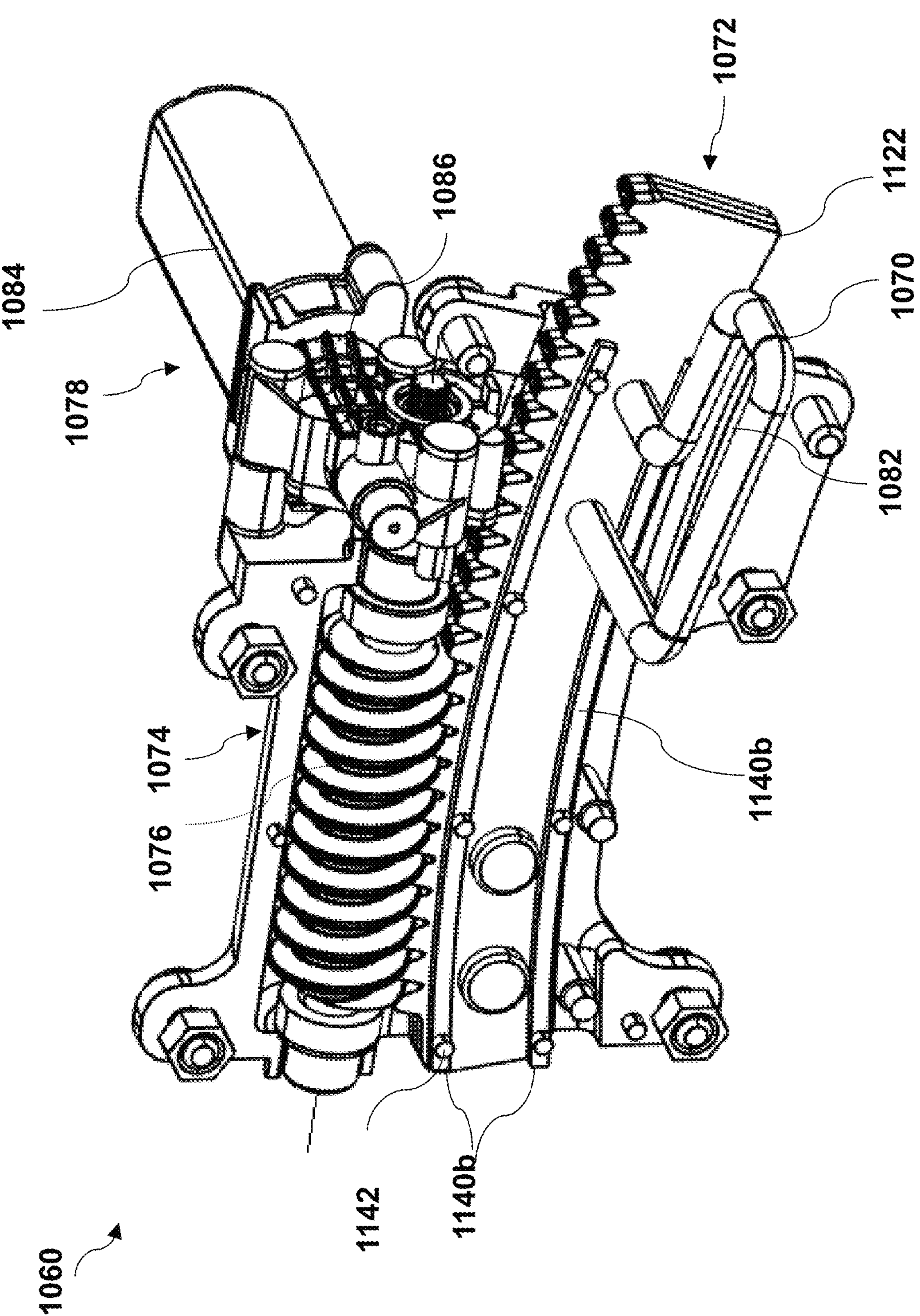
FIG. 14 is a perspective view generally illustrating an embodiment of a striker assembly in a first position, with a housing member hidden, according to teachings of the present disclosure.
Figure 15:
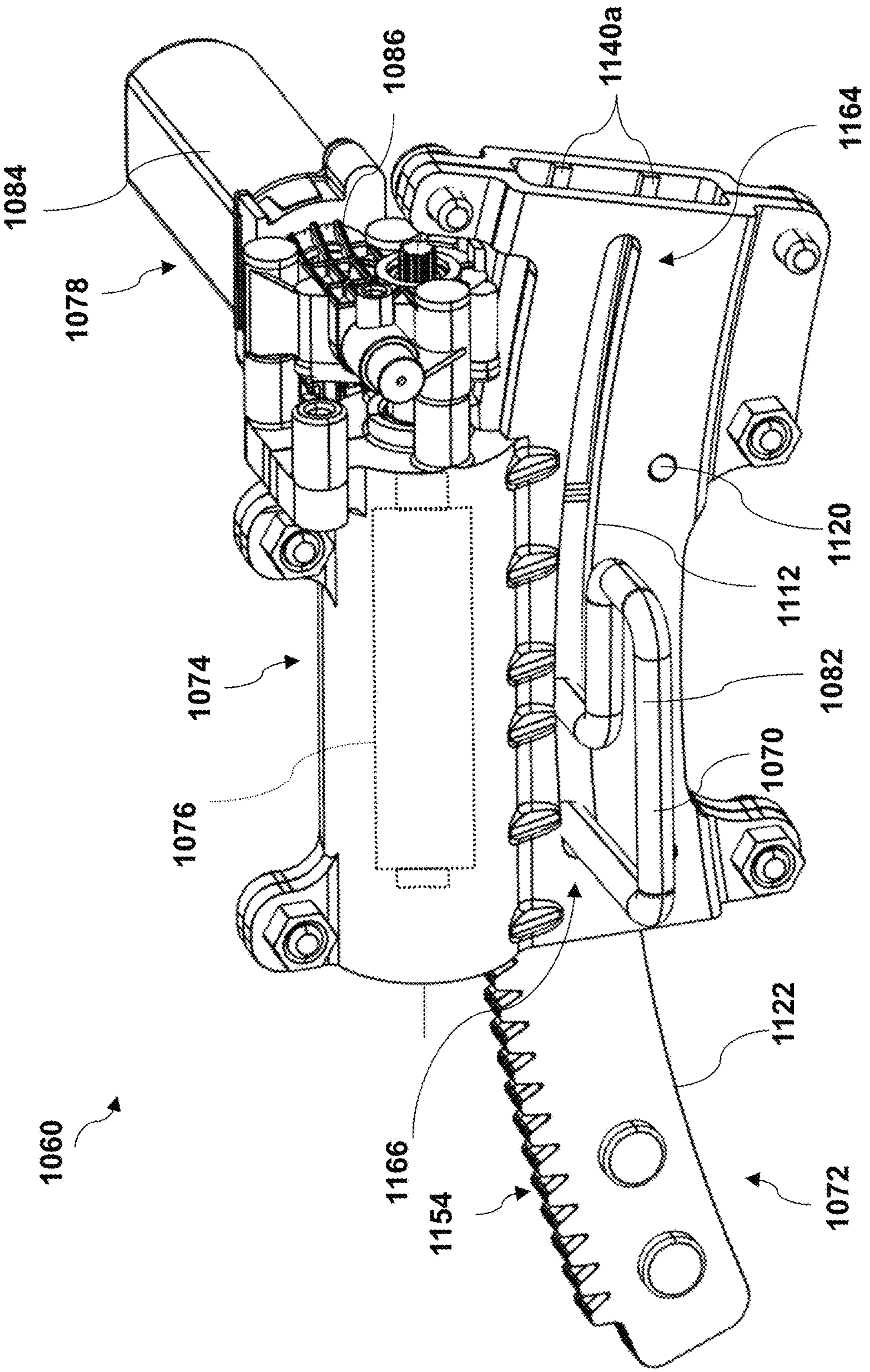
FIG. 15 is a perspective view generally illustrating an embodiment of a striker assembly in a second position according to teachings of the present disclosure.

Referring to FIG. 14, like the striker assembly 60, a thread 1152 of the worm screw 1076 of the striker assembly 1060 engages a plurality of gear segment teeth 1154 of the gear segment 1072. Actuation of the motor assembly 1078 rotates the worm screw 1076 to slide the gear segment 1072, which moves the striker 1070. As illustrated in FIGS. 11 and 14, the striker 1070 includes a first/extended position. In the first/extended position, the striker 1070 is disposed at or about a front end 1164 of the slot 1112 (see FIG. 11). As illustrated in FIG. 15, the striker 1070 includes a second/retracted position. In the second/retracted position, the striker 1070 is disposed at or about a rear end 1166 of the slot 1112. The motor assembly 1078, the worm screw 1076, and the gear segment 1072 are operably coupled to move the striker 1070 to the first and second positions and positions therebetween to adjust the rotational position of the seat back 44. As the striker 1070 moves with the gear segment 1072, the striker 1070 slides in the slot 1112, which can restrict movement of the striker 1070 and/or the gear segment 1072 in the radial direction (relative to the rotation axis 44*a*—see FIGS. 2 and 3). Additionally or alternatively, the slot 1112 can define the maximum range of sliding movement of the striker 1070 and/or the gear segment 1072.

Figure 16:
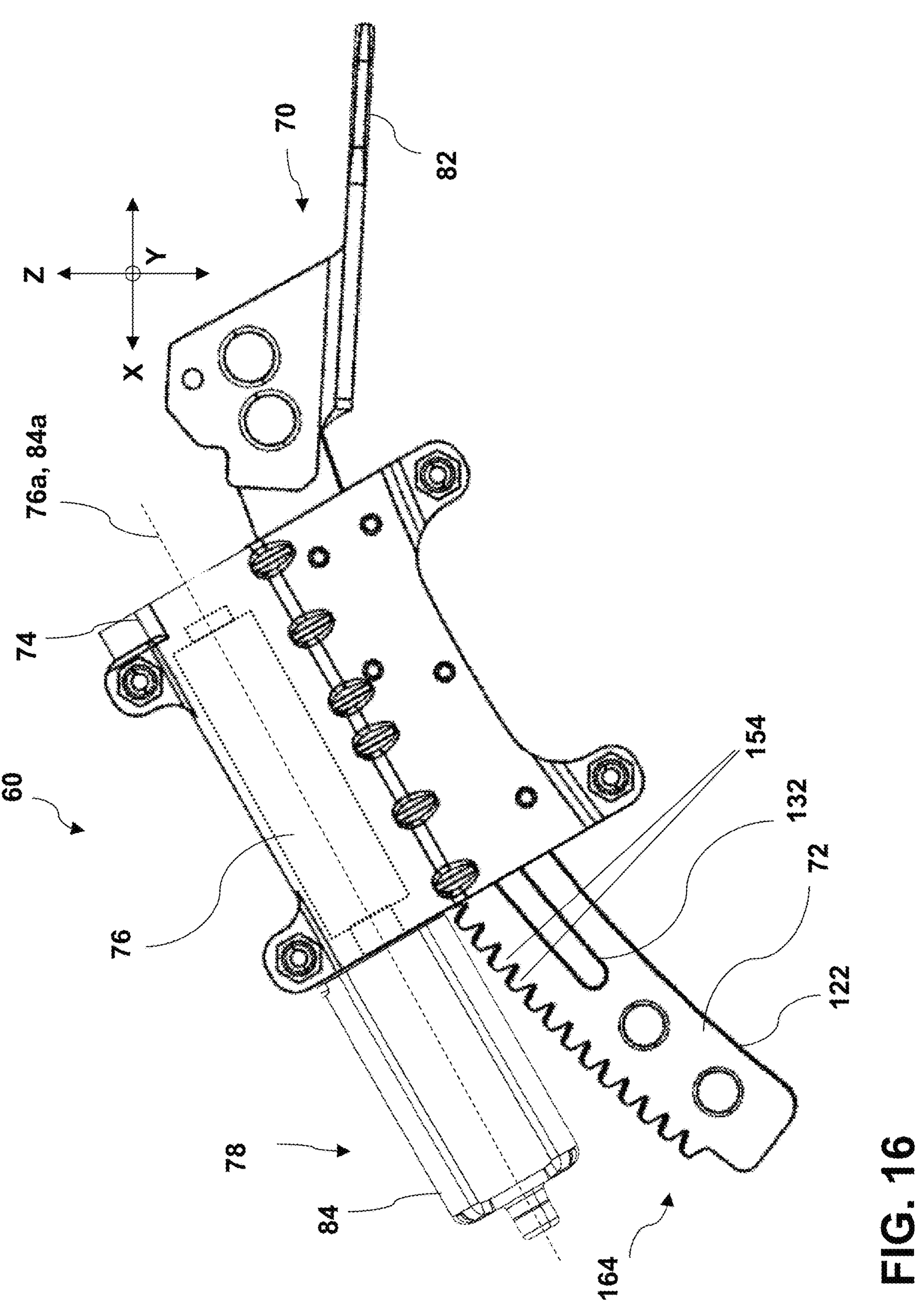
FIG. 16 is a perspective view generally illustrating an embodiment of a striker assembly according to teachings of the present disclosure.
Figure 17:
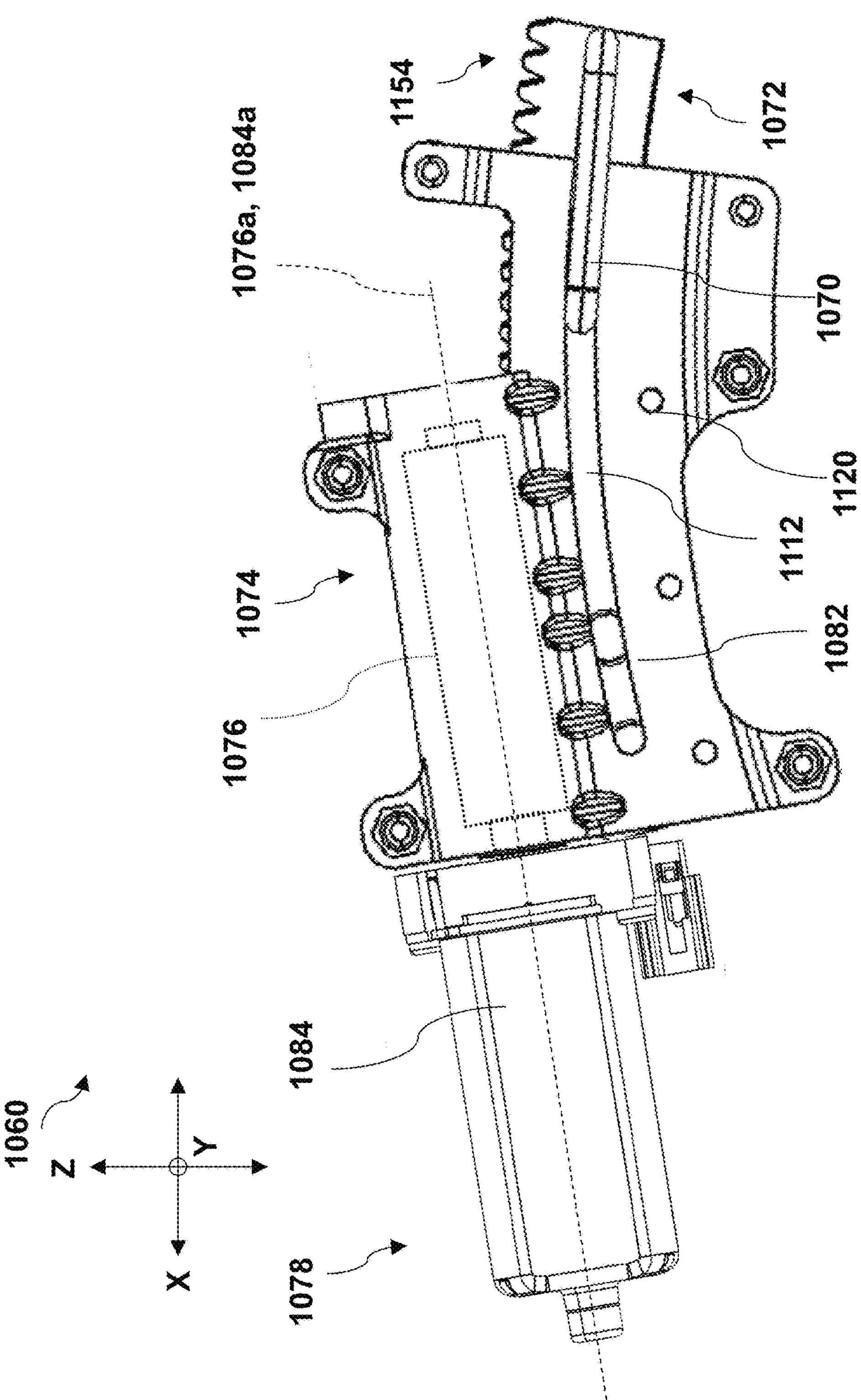
FIG. 17 is a perspective view generally illustrating an embodiment of a striker assembly according to teachings of the present disclosure.

Referring to FIGS. 16 and 17, optionally, the motor 84, 1084 of the motor assembly 78, 1078 can be directly coupled with the worm screw 76, 1076, such as without a transmission, and/or can be disposed such that a motor axis 84*a*, 1084*a* is concentric with the worm screw axis 76*a*, 1076*a*.

Figure 18:
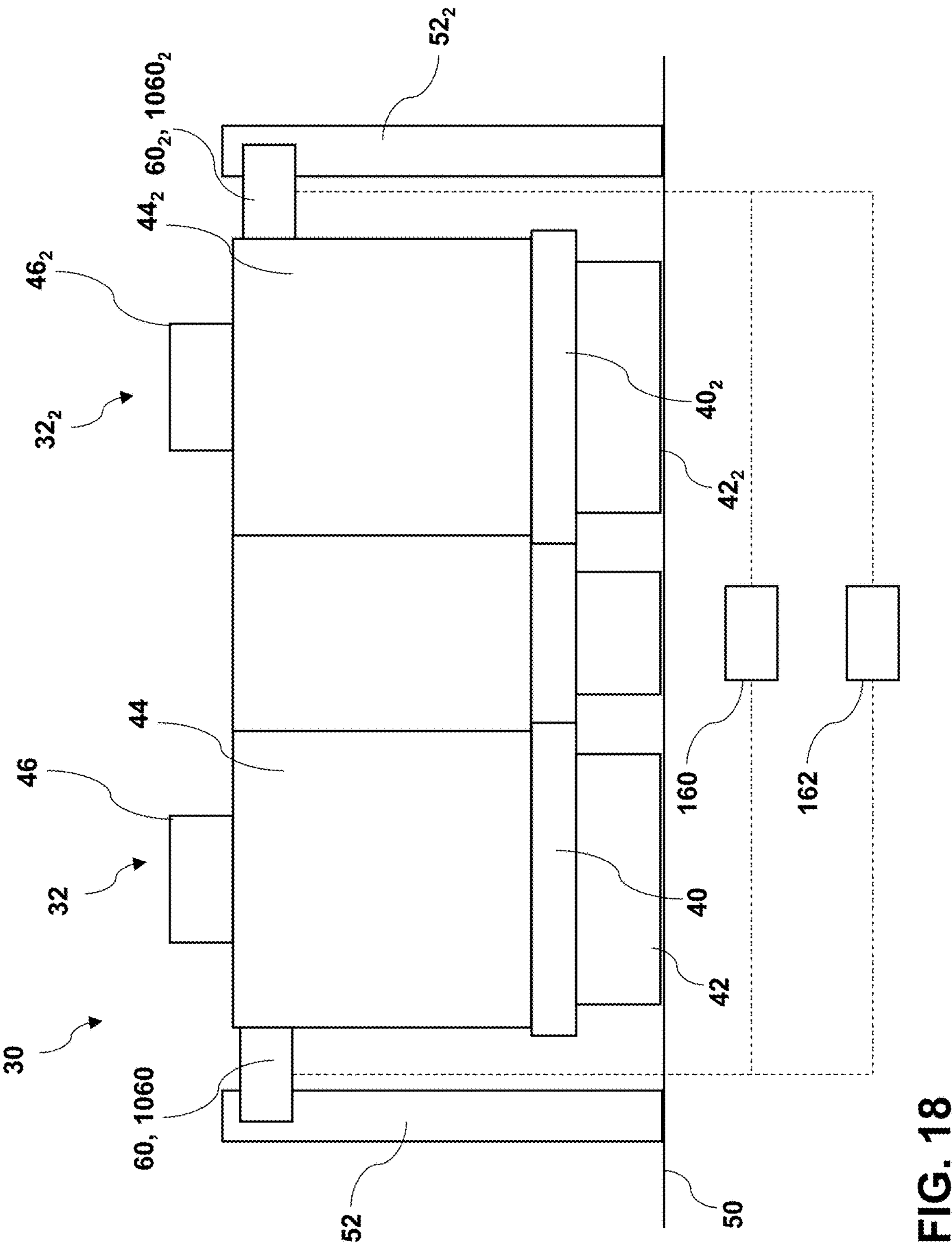
FIG. 18 is a schematic side view generally illustrating an embodiment of a seat system according to teachings of the present disclosure.

Referring to FIG. 18, a seat system 30 can include a plurality of seat assemblies, such as a first seat assembly 32 and a second seat assembly 322. The second seat assembly 322 can include a seat base 402, a seat frame 422, a seat back 442, and/or a headrest 462. In some examples, the seat assemblies 32, 322 can be disposed in a bench configuration and/or mounted to the mounting surface 50. The seat system 30 can include a first striker assembly 60, 1060 adjustably coupling the seat back 44 of the first seat assembly 32 to a first wall 52, and can include a second striker assembly 602, 10602 adjustably coupling the seat back 442 of the second seat assembly 322 to a second wall 522. An electronic controller 160 and/or a user interface 162 can control the striker assemblies 60, 1060, 602, 10602, separately and/or independently, to adjust rotational positions (e.g., recline angles) of the seat backs 44, 442.

The instant disclosure includes the following non-limiting embodiments:

A striker assembly for a seat, the striker assembly comprising: a motor; a worm screw operably coupled with the motor; a gear segment engaged with the worm screw; and a striker connected to the gear segment and configured for engagement with a latch of a seat back of the seat to adjustably couple the seat back with a mounting surface.

The striker assembly of any preceding embodiment, including a housing; wherein the worm screw and the gear segment are disposed at least partially in the housing; and the housing is configured for connection with said mounting surface.

The striker assembly of any preceding embodiment, wherein the housing includes a slot; and the striker extends from the gear segment out of the housing through the slot.

The striker assembly of any preceding embodiment, wherein the housing includes a bearing slidably supporting an inner radial surface of the gear segment.

The striker assembly of any preceding embodiment, wherein the striker is connected to the gear segment such that the striker slides with the gear segment relative to the housing.

The striker assembly of any preceding embodiment, wherein the gear segment includes a slot; and the housing includes a second bearing disposed partially in the slot of the gear segment.

The striker assembly of any preceding embodiment, wherein the gear segment includes a structural layer.

The striker assembly of any preceding embodiment, wherein the gear segment includes a structural layer and additional layer configured to reduce play between the gear segment and the worm screw.

The striker assembly of any preceding embodiment, wherein the worm screw is engaged with at least four gear segment teeth of the gear segment.

The striker assembly of any preceding embodiment, including a housing; a first bearing strip disposed at a first side of the gear segment; and a second bearing strip disposed at a second side of the gear segment; wherein the first bearing strip and the second bearing strip restrict transverse movement of the gear segment.

The striker assembly of any preceding embodiment, wherein the first bearing strip is integrally formed with the housing.

A seat assembly, comprising: the striker assembly of any preceding embodiment; the seat, including the seat back, a seat frame, and a seat base, the seat back rotatably coupled to the seat frame and/or the seat base; and the latch; wherein the latch is connected to the seat back and is selectively engageable with the striker.

The seat assembly of any preceding embodiment, wherein the striker includes an aperture; in a disengaged state of the latch, the latch is not disposed in the aperture; and in an engaged state of the latch, a portion of the latch is disposed in the aperture.

The seat assembly of any preceding embodiment, wherein the motor, the worm screw, the gear segment, and the striker are operably coupled such that, when the latch is engaged with the striker, actuation of the motor causes rotation of the seat back.

The seat assembly of any preceding embodiment, wherein the gear segment includes a first gear segment position and a second gear segment position; and in an engaged state of the latch (i) the seat back is disposed at a first rotational position when the gear segment is in the first gear segment position, and (ii) the seat back is disposed at a second rotational position when the gear segment is in the second gear segment position.

The seat assembly of any preceding embodiment, wherein a difference between the first and second rotational positions is greater than 2 degrees and less than 90 degrees.

The seat assembly of any preceding embodiment, wherein the seat back rotates about an axis of rotation; and the gear segment defines a portion of a circle centered at the axis of rotation.

The seat assembly of any preceding embodiment, wherein an angular extent of the gear segment is less than or equal to 90 degrees and greater than or equal to 2 degrees.

The seat assembly of any preceding embodiment, wherein a worm axis of the worm screw is disposed at an angle equal to or between 80 degrees and 100 degrees relative to the axis of rotation.

The seat assembly of any preceding embodiment, wherein a motor axis of the motor is parallel with the axis of rotation.

The seat assembly of any preceding embodiment, wherein a motor axis of the motor is parallel with the worm axis.

The seat assembly of any preceding embodiment, wherein a motor axis of the motor is perpendicular to the worm axis.

The seat assembly of any preceding embodiment, wherein the latch is connected to a top half of the seat back.

A seat system, comprising: the seat assembly of any preceding embodiment; a side wall; and a floor; wherein the seat assembly is mounted to the floor; and the striker assembly is mounted to the side wall.

The seat system of any preceding embodiment, wherein the side wall includes an aperture; the striker assembly is mounted to an outer surface of the side wall; and the striker extends through the aperture.

The seat system of any preceding embodiment, including a second side wall, a second seat assembly, and a second striker assembly adjustably coupling a seat back of the second seat assembly to the second side wall A vehicle including the seat system of any preceding embodiment.

In examples, a controller (e.g., electronic controller 160) may include an electronic controller and/or include an electronic processor, such as a programmable microprocessor and/or microcontroller. In embodiments, a controller may include, for example, an application specific integrated circuit (ASIC). A controller may include a central processing unit (CPU), a memory (e.g., a non-transitory computer-readable storage medium), and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," "an embodiment," "with some configurations," "in some configurations," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," "an embodiment," "with some configurations," "in some configurations," or the like, in places throughout the specification are not necessarily all referring to the same embodiment. Furthermore, the particular features, structures, and/or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element, unless the context clearly indicates otherwise. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above. The term "set" or a "set" of elements can be any number of elements, including only one.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both elements, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. Uses of "and" and "or" are to be construed broadly (e.g., to be treated as "and/or"). For example and without limitation, uses of "and" do not necessarily require all elements or features listed, and uses of "or" are inclusive unless such a construction would be illogical. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. A striker assembly for a seat, wherein the striker assembly comprises:

a motor;

a worm screw operably coupled with the motor;

a gear segment engaged with the worm screw; and a striker connected to the gear segment and adapted for engagement with a latch of a seat back of the seat to adjustably couple the seat back with a mounting surface, wherein the gear segment comprises at least three layers such that a second layer is positioned between a first layer and a third layer and the second layer is adapted to reduce play between the gear segment and the worm screw.

2. The striker assembly of claim 1, wherein the striker assembly further includes a housing, and wherein the worm screw and the gear segment are disposed at least partially in the housing, and wherein the housing is adapted for connection with said mounting surface.

3. The striker assembly of claim 2, wherein the housing includes a slot, and the striker extends from the gear segment out of the housing through the slot.

4. The striker assembly of claim 2, wherein the housing includes a bearing slidably supporting an inner radial surface of the gear segment.

5. The striker assembly of claim 4, wherein the striker is connected to the gear segment such that the striker slides with the gear segment relative to the housing.

6. The striker assembly of claim 4, wherein the gear segment includes a slot, and the housing includes a second bearing disposed partially in the slot of the gear segment.

7. The striker assembly of claim 1, wherein the gear segment includes a structural layer.

8. The striker assembly of claim 1, wherein the worm screw is engaged with at least four gear segment teeth of the gear segment.

9. The striker assembly of claim 1, wherein the striker assembly includes a housing;

a first bearing strip disposed at a first side of the gear segment; and a second bearing strip disposed at a second side of the gear segment;

wherein the first bearing strip and the second bearing strip restrict transverse movement of the gear segment.

10. The striker assembly of claim 9, wherein the first bearing strip is integrally formed with the housing.

11. A seat assembly, wherein the seat assembly comprises:

the striker assembly of claim 1;

the seat, including the seat back, a seat frame, and a seat base, the seat back rotatably coupled to the seat frame and/or the seat base; and the latch;

wherein the latch is connected to the seat back and is selectively engageable with the striker.

12. The seat assembly of claim 11, wherein each of the at least three layers include a layer slot aligned with a layer slot of adjacent layers to collectively define a slot.

13. The seat assembly of claim 11, wherein the striker includes an aperture;

in a disengaged state of the latch, the latch is not disposed in the aperture; and in an engaged state of the latch, a portion of the latch is disposed in the aperture.

14. The seat assembly of claim 11, wherein the motor, the worm screw, the gear segment, and the striker are operably coupled such that, when the latch is engaged with the striker, actuation of the motor causes rotation of the seat back.

15. The seat assembly of claim 11, wherein the gear segment includes a first gear segment position and a second gear segment position; and in an engaged state of the latch (i) the seat back is disposed at a first rotational position when the gear segment is in the first gear segment position, and (ii) the seat back is disposed at a second rotational position when the gear segment is in the second gear segment position.

16. The seat assembly of claim 15, wherein a difference between the first and second rotational positions is greater than 2 degrees and less than 90 degrees.

17. The seat assembly of claim 11, wherein the seat back rotates about an axis of rotation; and the gear segment defines a portion of a circle centered at the axis of rotation.

18. The seat assembly of claim 17, wherein an angular extent of the gear segment is less than or equal to 90 degrees and greater than or equal to 2 degrees.

19. The seat assembly of claim 17, wherein a worm axis of the worm screw is disposed at an angle equal to or between 80 degrees and 100 degrees relative to the axis of rotation.

20. The seat assembly of claim 19, wherein a motor axis of the motor is parallel with the axis of rotation.

* * * * *